Figure 1:
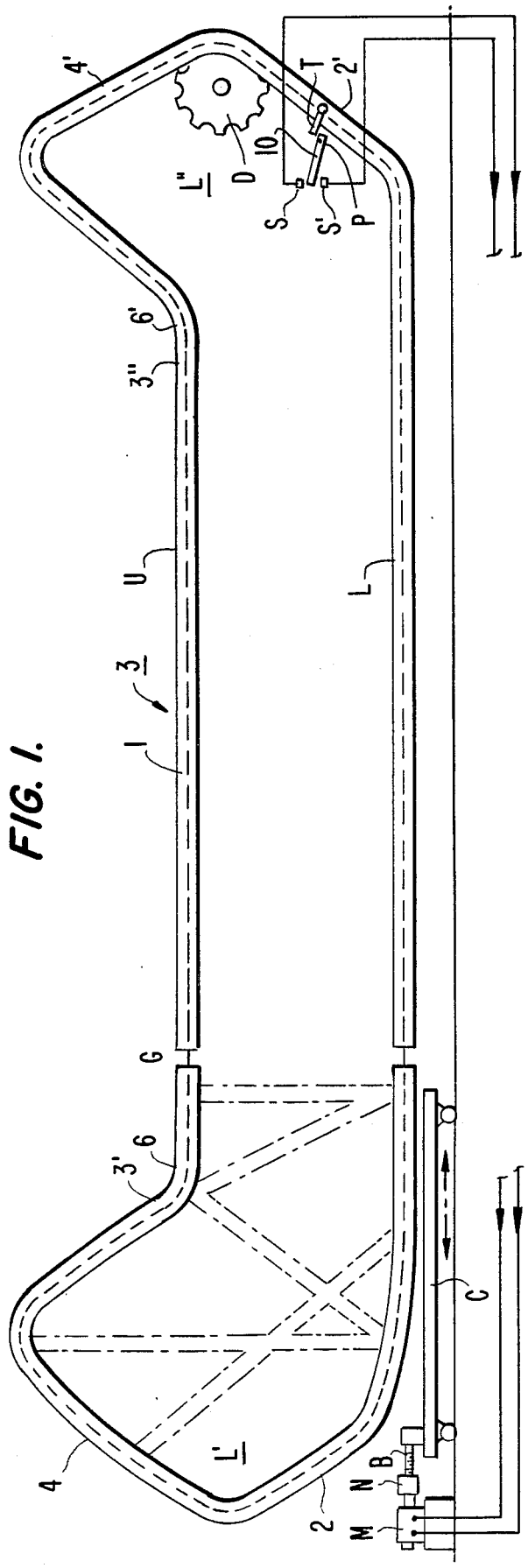

United States Patent [19]

Nevo-Hacohen

[11] Patent Number: 4,759,438
[45] Date of Patent: Jul. 26, 1988

[54] METHOD OF AND APPARATUS FOR ADJUSTING THE LENGTH OF CHAIN CONVEYORS AND THE LIKE TO ACCOMMODATE FOR ELONGATION OR CONTRACTION THEREOF RESULTING FROM VARIATIONS IN LOAD, WEAR, RESILIENCY, TENSION AND SIMILAR FACTORS

[75] Inventor: Jacob I. Nevo-Hacohen, Brookline, Mass.

[73] Assignee: Auto-Veyor, Inc., Brookline, Mass.

[21] Appl. No.: 870,817

[22] Filed: Jun. 5, 1986

[51] Int. Cl.$^4$ .............................................. B65G 23/44
[52] U.S. Cl. ..................................... 198/810; 198/816
[58] Field of Search ......................... 198/810, 813, 816

[56] References Cited

U.S. PATENT DOCUMENTS

| | | | |
|---|---|---|---|
| 2,788,116 | 4/1957 | Wood | 198/810 |
| 2,794,538 | 6/1957 | Schenk | 198/810 |
| 3,197,045 | 7/1965 | Nevo-Hacohen | 414/248 |
| 3,447,666 | 6/1969 | Nevo-Hacohen | 198/158 |
| 3,647,050 | 3/1972 | Neal | 198/816 X |
| 3,777,879 | 12/1973 | Dehne | 198/813 X |
| 3,796,488 | 3/1974 | Tanaka et al. | 198/813 X |
| 3,963,115 | 6/1976 | Teske et al. | 198/810 X |
| 4,396,111 | 8/1983 | Kent | 198/810 |
| 4,493,414 | 11/1983 | Nevo-Hacohen | 198/800 |

FOREIGN PATENT DOCUMENTS 22286 2/1977 Japan ................................. 198/816

*Primary Examiner*—Stephen J. Novosad
*Assistant Examiner*—John F. Letchford
*Attorney, Agent, or Firm*—Rines and Rines, Shapiro and Shapiro

[57] ABSTRACT

An automatic method of and apparatus for taking up slack or relieving undue tension in a closed loop chain conveyor traveling in a corresponding track loop by dividing the track into separate sections, sensing the elongation or contraction in the chain in one section, and responding to such sensing to move the other track section away from or toward the said one track section to compensate for the chain length variation.

19 Claims, 1 Drawing Sheet

U.S. Patent  Jul. 26, 1988  4,759,438

METHOD OF AND APPARATUS FOR ADJUSTING THE LENGTH OF CHAIN CONVEYORS AND THE LIKE TO ACCOMMODATE FOR ELONGATION OR CONTRACTION THEREOF RESULTING FROM VARIATIONS IN LOAD, WEAR, RESILIENCY, TENSION AND SIMILAR FACTORS

The present invention relates to closed loop conveyor systems adapted to transport loads and the like, being more particularly directed to conveyor systems of the link roller chain type such as described, for example, in my earlier U.S. Pat. Nos. 3,197,045, 3,447,666, and 4,493,414, adapted to carry car or other load-supporting platforms and susceptible to elongation (slack) or contraction (tautness) as a result of variations in load, wear, resiliency, tension and similar factors and requiring techniques for compensatory adjustment of chain length. More specifically, in its preferred, though not exclusive, application to chain loop conveyors traveling in tracks, the invention relates to an improved method of and apparatus for automatically adjusting the track length in response to variations in chain conveyor length.

In short-length conveyor systems, it has been customary to provide the so-called "take-up" arrangements comprising manually adjustable bolts and nuts for lengthening or shortening the track length as required—such techniques requiring manual adjustment and attendant awkwardness. Longer conveyor systems have employed a counter-weight (such as a concrete block) that pulls away a section of track, involving a fixed force pre-tensioning arrangement which, while it can effect a certain minimum tension at any time, under any load or no-load conditions, has the most serious and costly disadvantage residing in the fact that this pre-tensioning "consumes" up to 40% of the chain "working-load" operating life through increasing chain wear and breakdown.

Underlying the present invention is a novel technique which divides or separates the conveyor track, within which the chain loop travels, into two sections; one in which the drive for the chain and the sensing of elongation or slack (or contraction or tautness) is effected, and the other automatically longitudinally movable away from or toward the said one section in response to such sensing to provide compensation for undesired chain length variation.

An object of the invention, accordingly, is to provide a new and improved method of and apparatus for automatic conveyor length adjustment in response to sensed length variations that obviate the above-mentioned and other disadvantages of prior approaches to length adjustment, and provide for automatic effective, low-wear and inexpensive track length variation.

A further object is to provide a novel adjustable-length slack take-up apparatus for conveyors that, while particularly useful for parallel transversely spaced conveyors carrying platforms therebetween, as for storing and retrieving automobiles or other loads, is also more generally useful, as well.

Other and further objects will be explained hereinafter and are more particularly delineated in the appended claims.

In summary, however, from one of its aspects, the invention embraces a method, particularly useful with a longitudinally extending closed chain loop conveyor traveling within a corresponding track loop, for adjusting the track length to compensate for elongation or contraction caused by such factors as variation in load carried by the chain, wear, resilience and tension, that comprises, separating the track loop into two separate sections between which the chain loop conveyor may circulate, driving the chain at one of the sections, sensing in said one section chain elongation or contraction, and longitudinally moving the other track section in response to said sensing, away from or toward the said one section, respectively, to compensate therefor. Preferred apparatus and best mode embodiment and details are later presented.

Figure 2:
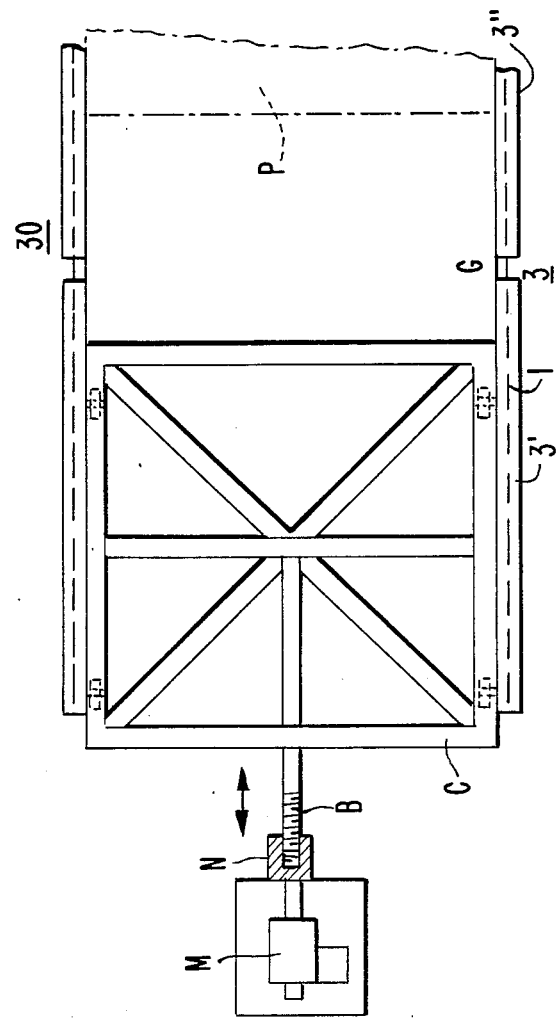

The invention will now be described with reference to the accompanying drawing,

FIG. 1 of which is a side elevation showing the invention in preferred form, illustratively applied to closed chain loop conveyors traveling in enclosing track sections as of the type described in said Letters Patent; and FIG. 2 is a top elevation showing the "take-up" end of the conveyor of FIG. 1 carried with a parallel similar conveyor by an adjustable-position carriage, and supporting car or other platforms therebetween.

Referring to FIG. 1, a closed loop chain as of the link-roller type described in said Letters Patent, is schematically shown at 1 traveling within a corresponding track 3 illustrated as divided or separated at G into a short left-hand track section 3', including the left-hand end loop portion L', and a long right-hand track section 3" having at its right-hand end, the loop portion L". In actual practice, for the car-conveying or similar illustrative purposes before mentioned, a pair of parallel laterally spaced tracks with their conveyors will be employed, as shown at 3 and 30 in FIG. 2, with the load-bearing platforms P supported and carried therebetween as described in said Letters Patent, though the invention is certainly useful with individual track-conveyor systems, as well.

For this preferred illustrated application of the invention, moreover, the track loop 3 is shown comprising a lower longitudinally extending track portion L, and an upper parallel track portion U having complementary end direction-changing loop portions L' and L" upwardly extending transversely from the lower to the upper track portion. The end loops first incline upwardly and outwardly from the lower track portion (at 2 to the left for L', and at 2' to the right, for L"), then reversely incline inwardly and upwardly above the upper track portion (at 4 and 4', respectively), and finally then downwardly to meet the upper track portion at the left-hand end 6 of the upper track portion of section 3', and at the right-hand end 6' of the upper track portion of section 3".

The drive (such as a sprocket D engaging the chain roller-links) is preferably disposed in the region between the inclined portion 2' and reversely inclined portion 4' of the end loop L" and, for example, directs the chain clockwise along the track loop. From experience, it has been found that when the chain travels or rides within such an enclosed track, say clockwise, slack in the chain is, in practice, accumulated just beyond (above, as shown) the drive sprocket D. The shape of the end loop provides room for such elongation of chain or slack to occur and to insure that it is within small variations. The chain slack manifests itself as a "hanging" off the track, outwards, with the rollers of the slackened chain which are engaging against a spring-held tongue T in the track causing the same to pivot the left-hand end of a lever 10 downward about rotating point P into engagement with sensor contacts S', which activates the drive of a motor M in one direction.

The motor M is shown fixedly mounted to the floor on a stationary platform, and through well-known and appropriate speed-reducing and brake assemblies, rotates a threaded nut N, say clockwise, in response to the upper sensor engagement at S. This will cause a threaded screw bolt B, received within nut N and fixed to a rollable carriage C that carries the end loop track section 3', to move that section longitudinally to the left, away from track section 3", and thus re-tensioning the chain and taking up the slack, whereupon the lever 10 will rise out of engagement with sensor S because of its unbalanced nature, as shown. Similarly, should the chain become too taut, T will be urged into the track causing the weight of the unbalanced lever 10 to cause it to rise into engagement with the upper contact sensor S, controlling the driving of the motor M (and nut N) in response thereto in the opposite direction, and moving the carriage C and track loop section 3' longitudinally to the right toward the section 3", relieving such chain tension, automatically. When the lever 10 is between S and S', the motor M is not activated.

Unlike the before-mentioned prior hung counterweight (concrete block) systems, thus, the present invention obviates the need for such arrangements and enables an automatic accommodation for variations in chain length with added substantial useful operating life to the chain and smoother operation.

If the chain travel is bi-directional (reversal), the sensing will be done, also, on the other side of the drive D, not shown, and, indeed the technique is useful with other than roller-link type chains (all such closed loop conveyors being herein generically termed "chains"). The geometry of the track sections may also, of course, be varied for the desired application and further modifications will also occur to those skilled in this art, such being considered to fall within the spirit and scope of the invention as defined in the appended claims.

What is claimed is:

1. In a longitudinally extending closed chain loop conveyor traveling within a corresponding track loop, a method of adjusting the track length to compensate for elongation or contraction caused by such factors as variation in load carried by the chain, wear, resilience and tension, that comprises, separating the track loop into two separate sections between which the chain loop conveyor may circulate, driving the chain at one of the sections, sensing in said one section chain elongation or contraction, and longitudinally moving the other track section in response to said sensing, away from or toward the said one section, respectively.

2. A method of chain length adjustment as claimed in claim 1 and in which said driving is effected at a direction-changing end loop portion of the said one section of the track loop.

3. A method of chain length adjustment as claimed in claim 2 and in which said sensing of chain length variation is effected at said end loop portion at a region just beyond that of said driving.

4. A method of chain length adjustment as claimed in claim 3 and in which said longitudinally extending chain loop conveyor and its track loop are oriented with substantially parallel longitudinal portions one above the other and with opposite end loop portions extending substantially transversely therebetween.

5. A method of chain length adjustment as claimed in claim 4 and in which the separating of the track loop is at a region located near an end loop portion of the other track section.

6. Conveyor apparatus having, in combination, a longitudinally extending closed chain loop traveling within a corresponding track loop, the track loop being separated into two sections between which the chain loop conveyor may circulate, means for driving the chain disposed along one of the sections, means also disposed along said one section for sensing chain elongation or contraction changes, and means responsive to said sensing means for moving the other track section, longitudinally away from or toward the said one section, respectively to compensate for said chain elongation or contraction changes.

7. Conveyor apparatus as claimed in claim 6 and in which said moving means comprises carriage means supporting said other track section.

8. Conveyor apparatus as claimed in claim 7 and in which said moving means is provided with motor drive means mounted in stationary position and controlled by said sensing means and having a longitudinally extending drive member linked to said carriage means to effect longitudinal compensating movement of the same.

9. Conveyor apparatus as claimed in claim 8 and in which said longitudinally extending drive member comprises a screw carried by said carriage means and a motorized nut driven by said motor drive means.

10. Conveyor apparatus as claimed in claim 6 and in which said chain driving means is disposed in a direction-changing end loop portion of said one section of the track loop.

11. Conveyor apparatus as claimed in claim 10 and in which said sensing means is disposed at the chain just beyond said driving means in said end loop portion of said one section.

12. Conveyor apparatus as claimed in claim 7 and in which said carriage means carries a direction-changing end loop portion of said other track section.

13. Conveyor apparatus as claimed in claim 12 and in which said longitudinally extending closed chain loop and its track loop are oriented with substantially parallel longitudinal portions one above the other and with opposite end loop portions extending substantially transversely therebetween.

14. Conveyor apparatus as claimed in claim 13 and in which the separation of the track is at a region disposed near an end loop portion of said other track section such that the carriage means carries the last-mentioned end loop portion.

15. Conveyor apparatus as claimed in claim 14 and in which the said one track section is much longer than the said other track section.

16. Conveyor apparatus as claimed in claim 14 and in which the end loop portions incline upwardly and outwardly from the lower longitudinal track portion, then reversely incline inwardly and upwardly above the upper longitudinal track portion and then downwardly to meet the upper longitudinal track portion.

17. Conveyor apparatus as claimed in claim 16 and in which said driving means is disposed in the region between the inclined and reversely inclined regions of the end loop portion of said one secton.

18. Conveyor apparatus as claimed in claim 17 and in which said sensing means is disposed in the inclined region of the end loop portion of said one section beyond said driving means.

19. Conveyor apparatus as claimed in claim 7 and in which said apparatus is provided with a second similar closed chain loop and two section track disposed laterally of and parallel to the first named loop and track and with its other track section also carried by said carriage means.

* * * * *